United States Patent
Ingles et al.

(10) Patent No.: US 10,483,706 B2
(45) Date of Patent: Nov. 19, 2019

(54) SOLENOID COIL WITH REPLACEABLE STATUS INDICATOR LIGHT

(71) Applicant: Automatic Switch Company, Florham Park, NJ (US)

(72) Inventors: Nicholas W. Ingles, Aiken, SC (US); German Gutierrez, Madison, NJ (US); Jeffrey Loprete, Boonton, NJ (US)

(73) Assignee: AUTOMATIC SWITCH COMPANY, Florham Park, NJ (US)

( * ) Notice: Subject to any disclaimer, the term of this patent is extended or adjusted under 35 U.S.C. 154(b) by 232 days.

(21) Appl. No.: 15/411,607

(22) Filed: Jan. 20, 2017

(65) Prior Publication Data

US 2018/0212384 A1    Jul. 26, 2018

(51) Int. Cl.
| | |
|---|---|
| *H01R 33/22* | (2006.01) |
| *H01R 31/02* | (2006.01) |
| *H01F 7/06* | (2006.01) |
| *H05B 33/08* | (2006.01) |
| *F16K 31/06* | (2006.01) |
| *G08B 21/18* | (2006.01) |
| *H02M 7/04* | (2006.01) |

(52) U.S. Cl.
CPC ............ *H01R 31/02* (2013.01); *H01F 7/064* (2013.01); *F16K 31/06* (2013.01); *G08B 21/18* (2013.01); *H01R 33/22* (2013.01); *H02M 7/04* (2013.01); *H05B 33/0809* (2013.01)

(58) Field of Classification Search
USPC .................................................. 361/139, 160
See application file for complete search history.

(56) References Cited

U.S. PATENT DOCUMENTS

| | | |
|---|---|---|
| 3,789,876 A | 2/1974 | Kempton et al. |
| 4,246,621 A | 1/1981 | Tsukioka |
| 4,250,501 A | 2/1981 | Pokrandt |
| 4,461,974 A | 7/1984 | Chiu |

(Continued)

FOREIGN PATENT DOCUMENTS

| | | |
|---|---|---|
| CN | 204284603 U | 4/2015 |
| WO | 8805131 A1 | 7/1988 |
| WO | 9919666 A1 | 4/1999 |

OTHER PUBLICATIONS

"Output Interfacing Circuits," Electronics Tutorials, electronicstutorials.ws, accessed: Dec. 2016. downloaded on http://www.electronicstutorials.ws/io/outputinterfacingcircuits.html.

(Continued)

*Primary Examiner* — Danny Nguyen
(74) *Attorney, Agent, or Firm* — Mackey Law Firm PLLC

(57) ABSTRACT

Apparatus and method provide a solenoid coil having a field-replaceable status indicator light, such as an LED. The status indicator light lights up when power is supplied to the solenoid coil to indicate the coil is energized and turns off when the coil is no longer energized. This allows technicians and other personnel working in hazardous environments to easily and reliably monitor the operational status of the solenoid coil. An electrical splitter adapter splits power between the solenoid coil and the status indicator light. The splitter adapter allows the status indicator light to be removed without interrupting power to the solenoid coil. Where the power is AC power, a rectifier may be provided on the splitter adapter to convert the AC power to DC power.

17 Claims, 5 Drawing Sheets

(56) References Cited

U.S. PATENT DOCUMENTS

| | | |
|---|---|---|
| 4,596,980 A | 6/1986 | Bergeron et al. |
| 4,764,884 A | 8/1988 | Noyori |
| 4,812,827 A | 3/1989 | Scripps |
| 5,015,944 A | 5/1991 | Bubash |
| 5,287,087 A | 2/1994 | Jencks et al. |
| 5,481,237 A | 1/1996 | Sarfati et al. |
| 5,764,152 A | 6/1998 | Kozleski |
| 5,915,666 A * | 6/1999 | Hayashi .............. F15B 13/0817 137/884 |
| 6,121,865 A | 9/2000 | Dust et al. |
| 6,657,845 B2 | 12/2003 | Kanomata et al. |
| 7,035,067 B2 | 4/2006 | Schmalz et al. |
| 8,424,563 B2 | 4/2013 | Haller et al. |
| 8,559,830 B2 | 10/2013 | Wayman et al. |
| 2012/0154167 A1 | 6/2012 | Jones et al. |
| 2016/0180686 A1 | 6/2016 | Penning et al. |
| 2017/0162279 A1 | 6/2017 | Bass et al. |

OTHER PUBLICATIONS

"Cable Grip Connector, 22MM Coil, 120 VAC/VDC, With Indicator Light," IMI Norgren®, norgren.com, Item 5493402, accessed: Dec. 2016. downloaded on http://store.norgren.com/us/en/detail/5493402/cablegripconnector22mmcoil120vacvdcwithindicatorlight.

"DC24V Current Convert Lamp Indicate Solenoid Valve Coil," AliExpress™, aliexpress.com, accessed: Dec. 2016. downloaded on https://www.aliexpress.com/item/DC24VCurrentConvertLampIndicateSolenoidValveCoil/32438480047.html.

* cited by examiner

SOLENOID COIL WITH REPLACEABLE STATUS INDICATOR LIGHT

FIELD OF THE INVENTION

The embodiments disclosed herein relate generally to solenoid coil assemblies used to control pilot valves and particularly to a solenoid coil having a field-replaceable LED or other status indicator light to indicate an operational status of the solenoid coil.

BACKGROUND OF THE INVENTION

Hazardous environments such as nuclear power plants, chemical processing plants, fuel storage tanks, and the like, require extensive safety precautions, including regular safety checks of systems and components to ensure they will function properly when needed. For example, scram solenoid pilot valves (SSPV) of the type used for emergency shutdown of a boiling water reactor in a nuclear power plant need to be checked on a regular basis to ensure they remain operational. While a number of backup safety measures are usually designed into such hazardous environments to avoid catastrophic failure should one or more of the solenoid valves stop working, it is nevertheless imperative to be able to detect when the valve has malfunctioned.

Prior attempts to detect when a solenoid valve has malfunctioned have included manually checking the solenoid coil, thermally scanning the solenoid coil, and connecting an LED or other status indicator light to the solenoid coil. However, manual checking in a hazardous environment like a nuclear power plant requires plant personnel to be exposed to potentially dangerous levels of radiation. And using thermal scanners may be less reliable for sensing individual solenoid coils when multiple valves are clustered together. LEDs and status indicator lights have been incorporated directly into the solenoid coil, but the lights have decreased life spans due to the coils being continuously energized in most applications. Once burned out, such LEDs and status indicator lights are extremely difficult to remove and replace in the field, often requiring substitution of the entire solenoid valve.

Accordingly, a need exists for a solenoid coil with an operational status indicator that may be quickly and conveniently replaced in the field.

SUMMARY OF THE INVENTION

The embodiments disclosed herein relate to an apparatus and method for indicating an operational status of a solenoid coil. The apparatus and method provide a solenoid coil having a field-replaceable status indicator light connected in parallel and proximate to the coil. The parallel-connected field-replaceable status indicator light lights up when power is supplied to the solenoid coil to indicate that the coil is being energized. The status indicator light turns off when power stops flowing to the solenoid coil to indicate that the coil is no longer being energized. This allows technicians and other personnel working in hazardous environments to easily and reliably monitor the operational status of the solenoid coil from a safe distance rather than having to manually check the coil. In some embodiments, the parallel connection of the solenoid coil to the status indicator light may be achieved using an electrical splitter adapter. The splitter adapter, which may be a T-shaped or a Y-shaped splitter adapter, provides power simultaneously to both the solenoid coil and the status indicator light. This allows the status indicator light to be quickly and conveniently swapped when the light burns out without needing to remove or replace the solenoid coil or even interrupt power to the coil. The power is typically AC power because of the operation of the solenoid coil, so for embodiments that also require DC power, as in the case of an LED status indicator light, a rectifier may be connected to or otherwise provided on the splitter adapter to convert the AC power to DC power.

In general in one aspect, the disclosed embodiments relate to a solenoid coil assembly. The solenoid coil assembly comprises, among other things, a solenoid coil operable to actuate a valve connected to the solenoid coil, and an electrical splitter adapter disposed between the solenoid coil and a light source, the electrical splitter adapter having electrical contacts that connect the solenoid coil in electrical parallel to the light source.

In general, in another aspect, the disclosed embodiments relate to a solenoid coil assembly comprising, among other things, a solenoid coil operable to actuate a valve connected to the solenoid coil and a light source affixed adjacent to the solenoid coil. The solenoid core assembly further comprises an electrical splitter adapter disposed between the solenoid coil and the light source, the electrical splitter adapter having electrical contacts that connect the solenoid coil in electrical parallel to the light source.

In general, in yet another aspect, the disclosed embodiments relate to a method of monitoring a solenoid coil. The method comprises, among other things, connecting a light source adjacent to and in electrical parallel with the solenoid coil, the light source operable to provide an indication of an operational status of the solenoid coil when power is flowing to the solenoid coil. The method further comprises replacing the light source with a replacement light source without interrupting the power flowing to the solenoid coil.

BRIEF DESCRIPTION OF THE DRAWINGS

The foregoing and other advantages of the disclosed embodiments will become apparent upon reading the following detailed description and upon reference to the drawings, wherein.

DETAILED DESCRIPTION OF THE DISCLOSED EMBODIMENTS

As an initial matter, it will be appreciated that the development of an actual, real commercial application incorporating aspects of the disclosed embodiments will require many implementation specific decisions to achieve the developer's ultimate goal for the commercial embodiment. Such implementation specific decisions may include, and likely are not limited to, compliance with system related, business related, government related and other constraints, which may vary by specific implementation, location and from time to time. While a developer's efforts might be complex and time consuming in an absolute sense, such efforts would nevertheless be a routine undertaking for those of skill in this art having the benefit of this disclosure.

It should also be understood that the embodiments disclosed and taught herein are susceptible to numerous and various modifications and alternative forms. Thus, the use of a singular term, such as, but not limited to, "a" and the like, is not intended as limiting of the number of items. Similarly, any relational terms, such as, but not limited to, "top," "bottom," "left," "right," "upper," "lower," "down," "up," "side," and the like, used in the written description are for clarity in specific reference to the drawings and are not intended to limit the scope of the invention.

As mentioned above, the disclosed embodiments relate to a solenoid coil having a field-replaceable status indicator light, such as an LED, connected in parallel and proximate to the coil. The status indicator light allows technicians and other personnel to monitor the operational status of the solenoid coil from a safe distance instead of manually checking. And the parallel connection of the solenoid coil to the status indicator light allows the light to be removed and replaced without interrupting power to the coil. A splitter adapter may be used to provide the parallel connection in some embodiments, such as a T-shaped splitter adapter or a Y-shaped splitter adapter. Power is normally AC power due to the solenoid coil, so a rectifier may be provided on the splitter adapter to convert the AC power to DC power in some embodiments in order to drive the status indicator light.

Figure 1:
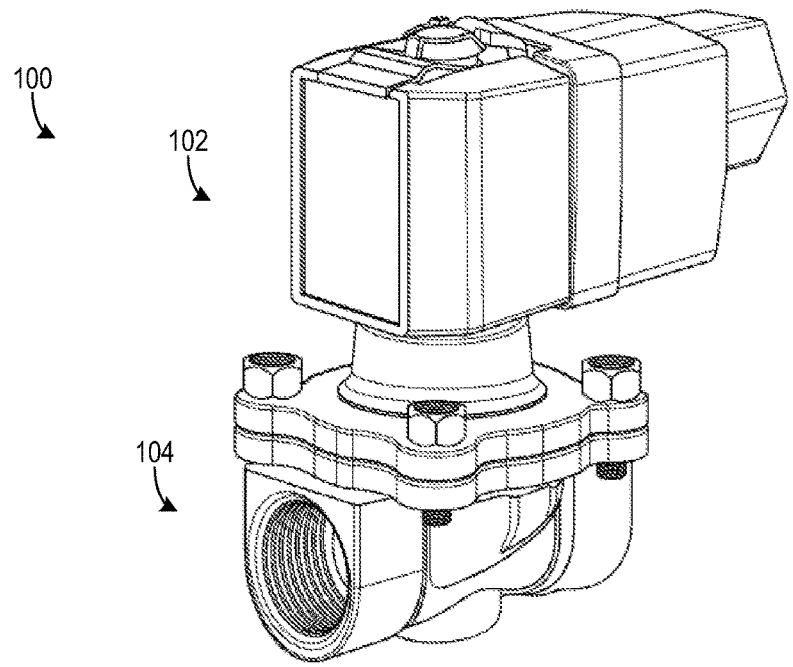
FIG. 1 illustrates a typical solenoid valve that may be used in a hazardous environment.

Turning now to FIG. 1, a perspective view of a solenoid valve 100 is shown. As can be seen, the solenoid valve 100 is composed primarily of a solenoid coil actuator 102 (or simply solenoid coil) connected to and operable for controlling a valve 104. The solenoid valve 100 depicted here may be a conventional solenoid valve or it may be a specialized valve designed specifically for hazardous environments (e.g., chemical processing plants, nuclear power plants, etc.). Examples of the latter types of valves include nuclear-qualified solenoid valves available from Automatic Switch Company of Florham Park, N.J. Such solenoid valves are often employed in critical applications, including emergency core cooling systems, emergency generator systems, steam generator feedwater systems, containment sampling systems, auxiliary feedwater systems, liquid radiation waste systems, turbine bypass systems, and the like. For these systems, it is essential to be able to detect when the solenoid valve and more specifically the solenoid coil has stopped working in order to avoid catastrophic failure.

Figure 2:
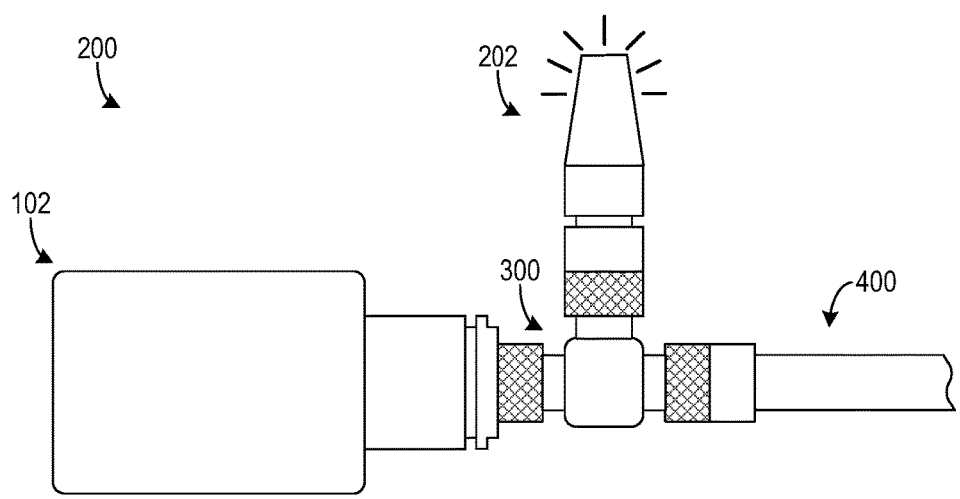
FIG. 2 illustrates an exemplary solenoid coil having a status indicator light connected thereto according to the disclosed embodiments.

Turning next to FIG. 2, a solenoid coil assembly 200 in accordance with the disclosed embodiments is shown. The solenoid coil assembly 200 comprises the previously mentioned solenoid coil 102, but fitted or otherwise provided with a status indicator light 202 to indicate an operational status of the actuator. The status indicator light 202 may be any suitable light source known to those skilled in the art that can be conveniently installed adjacent to the solenoid coil 102. Such a light source may include both conventional light sources such as incandescent light sources as well as more modern light sources such as LED light sources, and the like. Preferably the status indicator light 202 is a type that can withstand long-term exposure to harsh environmental conditions typically found in chemical processing plants and nuclear power plants. Color is not overly important, but the color of the light emitted by the status indicator light 202 should be a hue that is easily noticed by technicians and other plant personnel (e.g., green, red, violet, etc.).

In the exemplary embodiment of FIG. 2, the status indicator light 202 is connected to the solenoid coil 102 in parallel via an electrical splitter adapter 300. The splitter adapter 300 splits or otherwise provides power simultaneously to both the solenoid coil 102 and the status indicator light 202. This parallel connection allows the status indicator light 202 to be removed and replaced without interrupting power to the solenoid coil 102. The power comes from a power cable 400 connected to the splitter adapter 300 and is typically AC power in order to properly operate the solenoid coil 102. As such, the splitter adapter 300 is preferably a type that can split AC power with minimal power loss, although any suitable electrical splitter adapter known to those having ordinary skill in the art may be used.

Note that the term "operational status" is used in connection with whether power is flowing to the solenoid coil in some embodiments. Thus, if power is flowing to the solenoid coil, then the status indicator light is on and the coil is considered to be operational. Conversely, if no power flows to the solenoid coil, then the status indicator light is off and the coil is considered to be non-operational. In other embodiments, the term "operational status" may refer more generally whether the solenoid coil is operating as specified or whether it has malfunctioned, for example, due to a short circuit within the coil, an opened circuit within the coil, and the like, as well as whether power is flowing to the solenoid coil.

Figure 3:
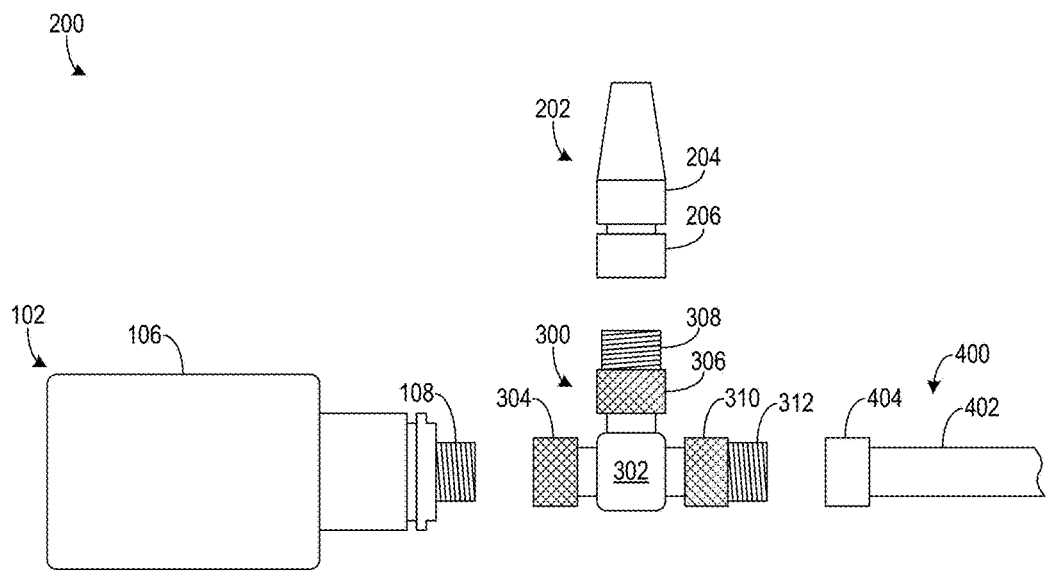
FIG. 3 illustrates a more detailed view of an exemplary solenoid coil having a status indicator light according to the disclosed embodiments.

FIG. 3 illustrates the splitter adapter 300 from FIG. 2 in more details. As can be seen, the splitter adapter 300 is composed mainly of a main body 302 from which extends a first coupling 304 and a second coupling 306. In this embodiment, the first coupling 304 is a female coupling and the second coupling 306 is a male coupling having a threaded plug 308 protruding therefrom. A third coupling 310 extends from the main body 302 and also has a threaded plug 312 protruding therefrom. Those having ordinary skill in the art will understand the female/male configuration of each coupling 304/306/310 is exemplary only and an opposite configuration may certainly be used without departing from the scope of the disclosed embodiments. Likewise, internal threads may be provided on some of the couplings 304, 306, 310 instead of external threads on the plugs 308, 312 in some embodiments, or the plugs 308, 312 may house female connectors (e.g., sockets) in some embodiments.

Implementation of the disclosed embodiments involves connecting or otherwise coupling the solenoid coil 102 to one coupling of the splitter adapter 300 (e.g., first coupling 304) while the status indicator light 202 is connected or otherwise coupled to another coupling (e.g., second coupling 306). The various couplings provide or otherwise facilitate mechanical and electrical contact in a manner known to those having ordinary skill in the art. In the embodiment shown here, the solenoid coil 102 includes an enclosure 106 having a threaded male plug 108 protruding therefrom that is sized and shaped to engage the female coupling 304 of the splitter adapter 300. Conversely, the status indicator light 202 includes a housing 204 from which extends a female coupling 206 that is sized and shaped to engage the threaded male plug 308 of the male coupling 306. The power cable 400 may be connected or otherwise coupled to the third coupling 310 of the splitter adapter 300 via a corresponding coupling 404 that terminates a wire 402 of the cable. The electrical couplings and plugs contemplated herein are conventional components known to those skilled in the art and therefore the specific details thereof are omitted.

Figure 4:
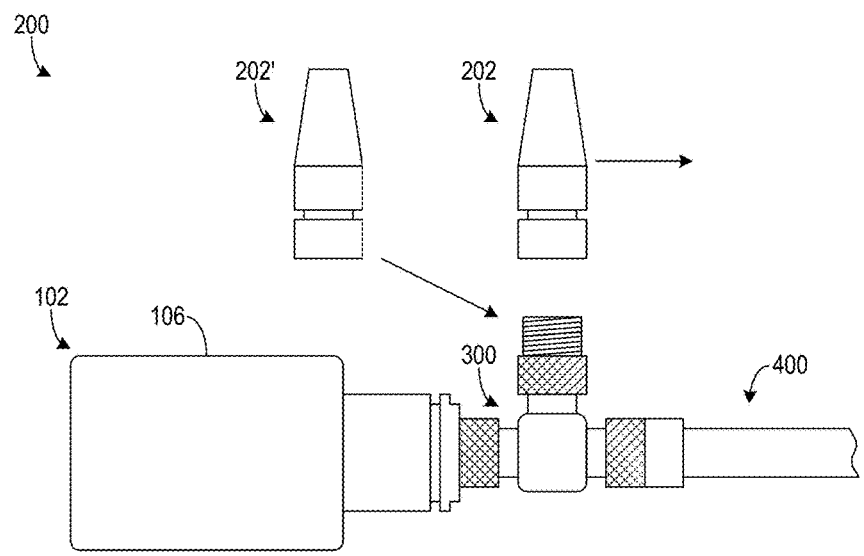
FIG. 4 illustrates an exemplary solenoid coil with a replacement status indicator light according to the disclosed embodiments.

The above arrangement allows the status indicator light 202 to be replaced in the field whenever the need arises, as shown in FIG. 4. In this figure, the status indicator light 202 has stopped working and needs to be replaced so monitoring of the operational status of the solenoid coil 102 is not disrupted. In accordance with the disclosed embodiments, the non-working status indicator light 202 may simply be removed and replaced with a working status indicator light 202' (see arrows). Power is continuously maintained to the solenoid coil 102 in the meantime via the splitter adapter 300 so there is no interruption of normal operations. Once the new status indicator light 202' is installed, monitoring of the solenoid coil 102 may continue.

Figure 5:
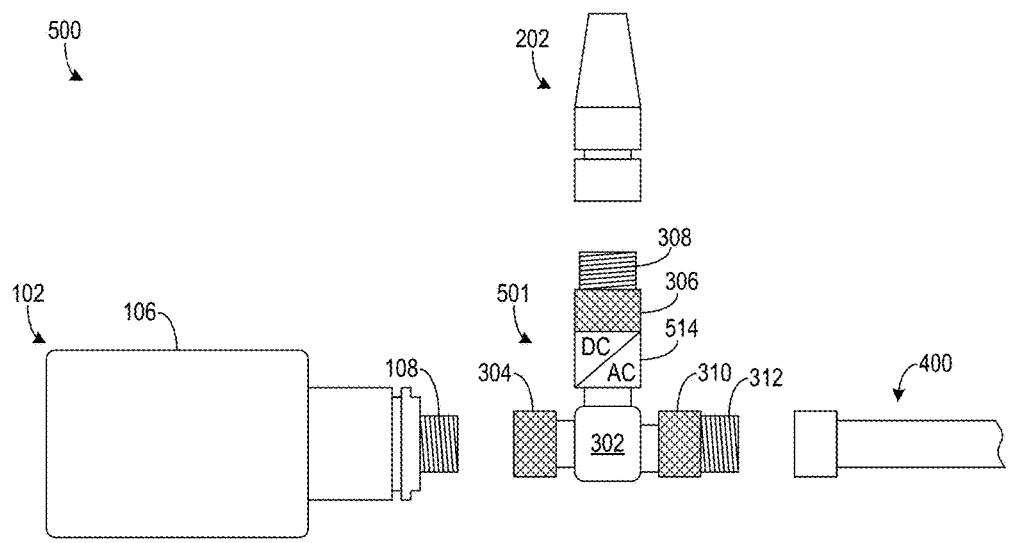
FIG. 5 illustrates an alternative solenoid coil with a status indicator light and an AC/DC converter according to the disclosed embodiments.

FIG. 5 illustrates a solenoid coil assembly 500 in which AC power from the power cable 400 is converted to DC power before being supplied to the status indicator light 202. In this figure, the solenoid coil 102, the status indicator light 202, and the power cable 400 are essentially the same as in prior figures. However, an alternative splitter adapter 501 having an AC/DC converter or rectifier 514 is provided that can convert the AC power from the power cable 400 to DC power. As can be seen, the alternative splitter adapter 500 is otherwise the same as the splitter adapter 300 from FIG. 3 except for the addition of the rectifier 514 between the main body 302 and the second coupling 306. The rectifier 514 may be any suitable rectifier known to those skilled in the art that may be connected to or otherwise incorporated within the main body 302 of the splitter adapter 500, such as a bridge rectifier (not expressly shown). The DC power resulting from the rectifier 514 may then be provided to the status indicator light 202 to drive, for example, an LED based status indicator light.

Figure 6:
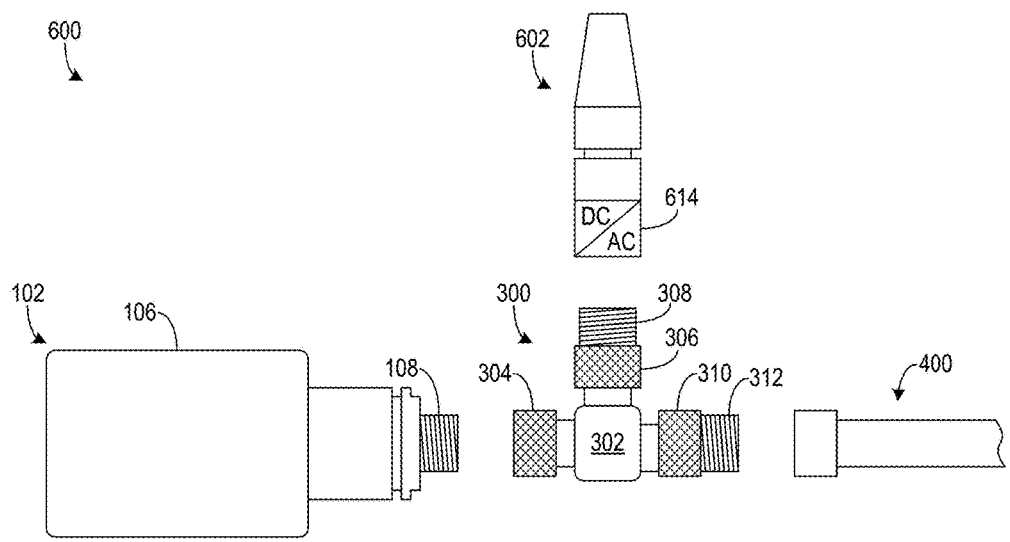
FIG. 6 illustrates yet another alternative solenoid coil with a status indicator light and an AC/DC converter according to the disclosed embodiments.

FIG. 6 illustrates an alternative solenoid coil assembly 600 in which AC power from the power cable 400 is converted to DC power by a rectifier provided on the status indicator light itself instead of on the splitter adapter. As can be seen, this embodiment employs a status indicator light 602 that has a rectifier 614 connected to or otherwise incorporated in the light 602 itself. Again, any suitable rectifier known to those skilled in the art may be used as the rectifier 614, including a bridge rectifier (not expressly shown), without departing from the scope of the disclosed embodiments.

Figure 7:
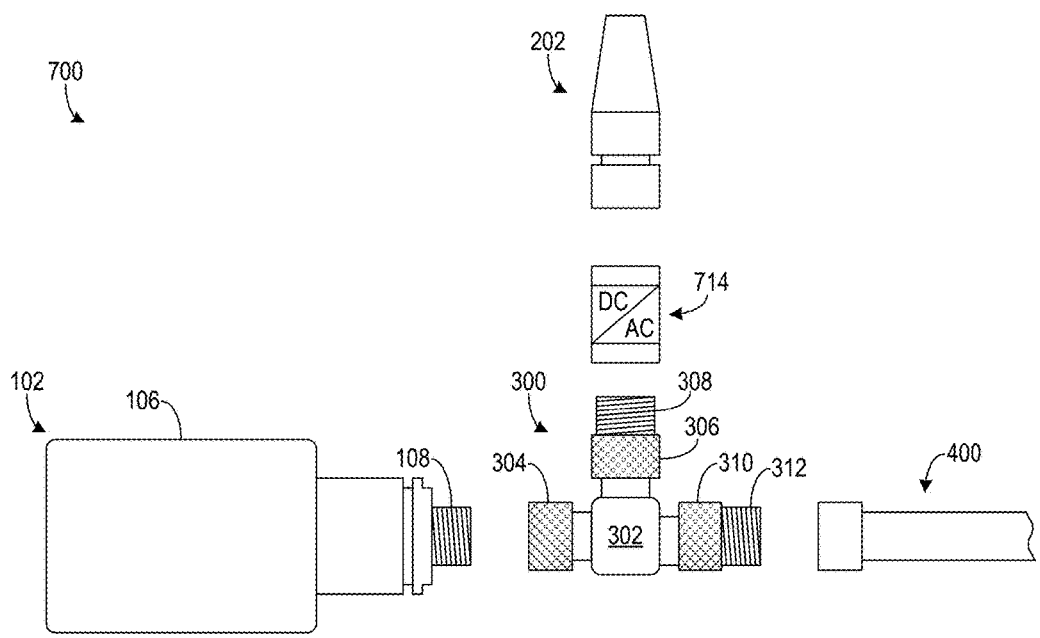
FIG. 7 illustrates still another alternative solenoid coil with a status indicator light and an AC/DC converter according to the disclosed embodiments.

FIG. 7 illustrates yet another alternative solenoid coil assembly 700 in which AC power from the power cable 400 is converted to DC power by a standalone rectifier. In this embodiment, a rectifier 714 may be used that is separate from both the status indicator light 202 and the splitter 301. The standalone rectifier 714 may then be connected to either the status indicator light 202 or the splitter 301 as needed, which allows the status indicator light 202 and/or the splitter 301 to be removed and replaced without having to replace the rectifier 714. As before, any suitable rectifier known to those skilled in the art may be used as the rectifier 714, including a bridge rectifier (not expressly shown), without departing from the scope of the disclosed embodiments.

Figure 8:
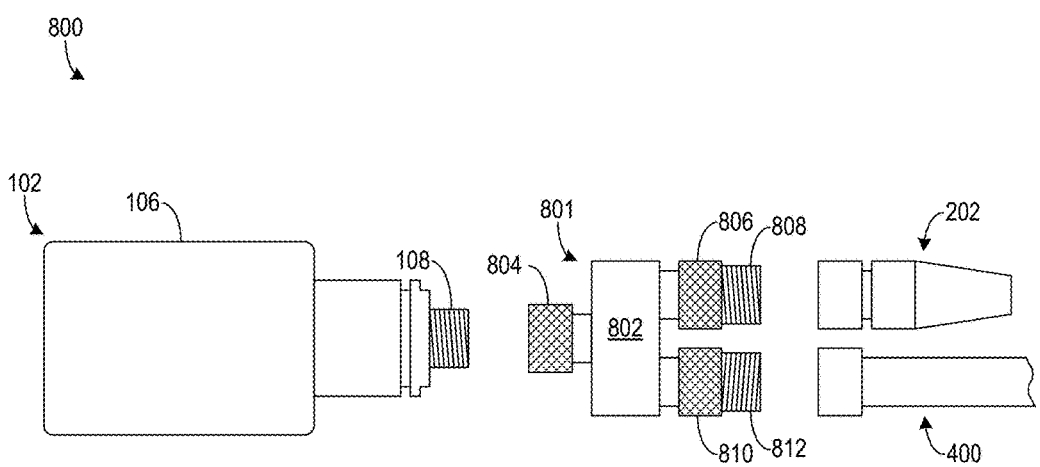
FIG. 8 illustrates an exemplary solenoid coil with a status indicator light and a Y-shaped splitter adapter according to the disclosed embodiments.

Although the splitter adapters disclosed herein have thus far been depicted as T-shaped splitter adapters, other adapter shapes may certainly be used as needed for a particular implementation. For example, depending on available room and number of surrounding components, a Y-shaped splitter adapter may be more suitable, as depicted in FIG. 8 at 800. In the solenoid coil assembly 800, a splitter adapter 801 is shown that is functionally the same as the splitter adapter 300 and has basically the same components (e.g., main body 802, first and second couplings 804, 806 extending therefrom, threaded plug 808 protruding from the second coupling 806, and third coupling 810 having threaded plug 812 protruding therefrom). However, the couplings and plugs of the splitter adapter 800 are arranged in a shape substantially resembling the letter "Y" instead of the "T" shape of the splitter adapter 300. Preferably the size of the disclosed splitter adapters are as compact as possible in order to occupy as little space as possible and also to allow the status indicator light 202 to be as close to the solenoid coil 102 as possible for ease of monitoring. Examples of splitter adapters having a size and shape similar to the splitter adapters disclosed herein may be viewed at www.molex.com, which is the Web site for Molex, Inc. of Lisle, Ill. (see, e.g., Part No. 1300350090).

Figure 9:
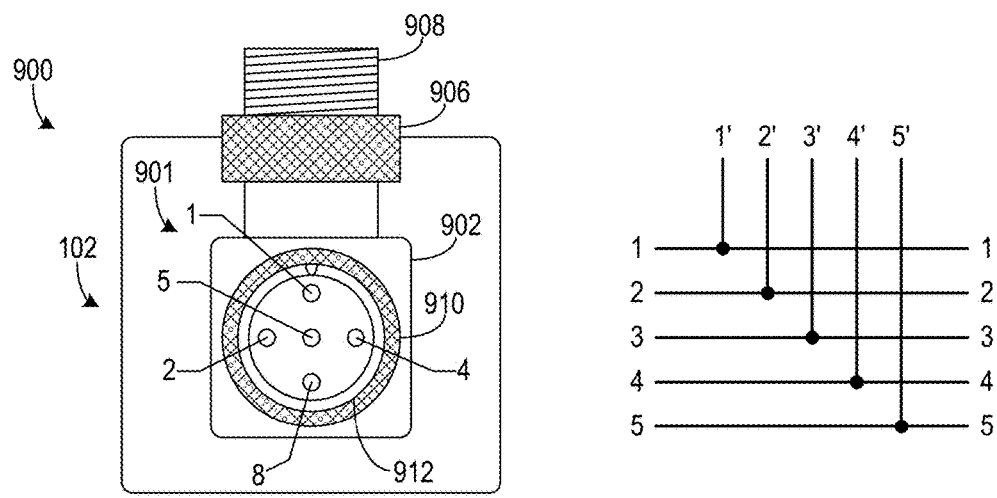
FIG. 9 illustrates an exemplary pinout and wiring for an exemplary solenoid coil with a status indicator light according to the disclosed embodiments.

Referring now to FIG. 9, an exemplary pinout and wiring diagram is shown for an exemplary solenoid coil assembly 900 according to the embodiments disclosed herein. The solenoid coil assembly 900 includes a splitter adapter 901 having basically the same components as the splitter adapters disclosed previously, but only its main body 902, second coupling 906 with threaded plug 908 protruding therefrom, and third coupling 910 with threaded plug 912 protruding therefrom are visible from this view (i.e., looking into the third coupling 910). The exemplary splitter adapter 901 shown here is a 5-pin (or socket) adapter, as indicated by the pins labeled 1-5, although only two of the pins are needed (e.g., pins 3 and 4) to provide power to the solenoid coil 102. From the wiring diagram accompanying the splitter adapter 901, it can be seen that each pin 1-5 is connected to a corresponding pin 1'-5', respectively, that provides a parallel connection for the pins 1-5. These parallel connections 1'-5' allow the splitter adapter 901 to split or otherwise provide power simultaneously to two devices (e.g., a solenoid coil and a status indicator light), such that one device may be removed and replaced without interrupting power to the other device.

In the foregoing embodiments, the status indicator light lights up when power is supplied to the solenoid coil, thus indicating that the coil is being energized, and vice versa. In some embodiments, it may be useful instead for the status indicator light to light up when power stops flowing to the solenoid coil to indicate that the coil is no longer being energized. Thus, the status indicator light lights up only when the solenoid coil is not working or not being energized. An example of the latter embodiments is illustrated in FIG. 10.

Figure 10:
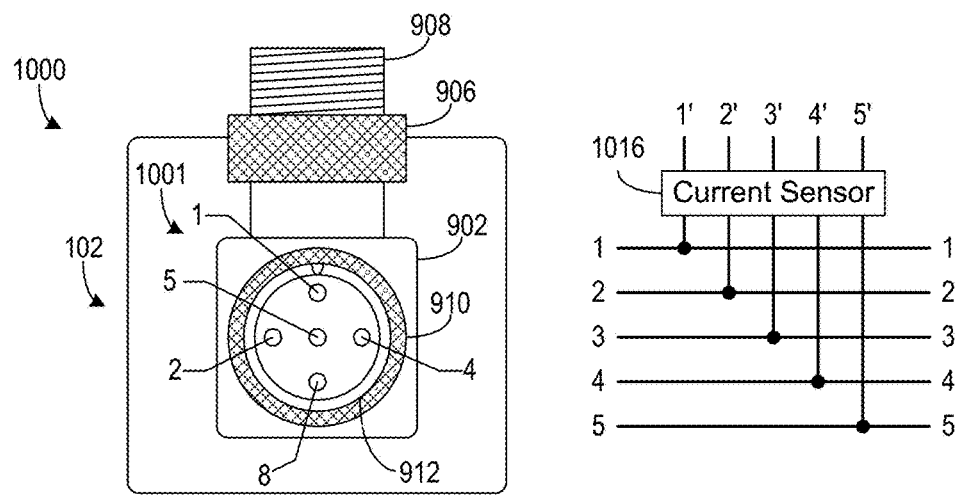
FIG. 10 illustrates an alternative pinout and wiring for an exemplary solenoid coil with a status indicator light according to the disclosed embodiments.

As can be seen in FIG. 10, an exemplary solenoid coil assembly 1000 has a splitter adapter 1001 that is also a 5-pin (or socket) adapter and includes the same components as the splitter adapter 900 from FIG. 9. However, the accompanying wiring diagram shows each pin 1-5 of the splitter adapter 1000 is connected to a corresponding pin 1'-5' via a current sensor 1016. In general operation, the current sensor 1016 substantially blocks or otherwise prevents current from flowing to the status indicator light while power is being supplied to the solenoid coil. When it senses current is no longer flowing to the solenoid coil, the current sensor 1016 starts providing or allowing current to flow to the status indicator light. In this way, the status indicator light lights up to indicate that the solenoid coil is no longer operational. Any suitable current sensor known to those having ordinary skill in the art may be used, whether implemented as discrete electrical components or as an integrated circuit (e.g., microcontroller, FPGA, ASIC, etc.), without departing from the scope of the disclosed embodiments.

While particular aspects, implementations, and applications of the present disclosure have been illustrated and described, it is to be understood that the present disclosure is not limited to the precise construction and compositions disclosed herein. For example, instead of a current sensor in the splitter adapter, the current sensor may be provided as a standalone unit, or as part of the status indicator light, in a similar manner to the rectifier Therefore, various modifications, changes, and variations may be apparent from the foregoing descriptions without departing from the spirit and scope of the disclosed embodiments as defined in the appended claims.

What is claimed is:

1. A solenoid coil assembly, comprising:
a solenoid coil operable to actuate a valve connected to the solenoid coil;
a light source affixed adjacent to the solenoid coil; and
an electrical splitter adapter disposed between the solenoid coil and the light source, the electrical splitter adapter having electrical contacts that connect the solenoid coil in electrical parallel to the light source;
wherein the electrical splitter adapter is configured to be connected to an AC power source and to provide power from the AC power source to both the solenoid coil and the light source; and
further comprising a rectifier disposed between the electrical splitter adapter and the light source, the rectifier being operable to convert AC power from the AC power source to DC power.

2. The solenoid coil assembly of claim 1, further comprising the AC power source and wherein the electrical splitter adapter is connected to the AC power source.

3. The solenoid coil assembly of claim 2, wherein the light source is one of the following light sources: an incandescent light source, and an LED light source.

4. The solenoid coil assembly of claim 3, wherein the light source is configured to light up when power is flowing to the solenoid coil.

5. The solenoid coil assembly of claim 3, wherein the light source is configured to light up when power has stopped flowing to the solenoid coil.

6. The solenoid coil assembly of claim 3, wherein the light source may be removed without interrupting power to solenoid coil.

7. The solenoid coil assembly of claim 1, wherein the electrical splitter adapter is an at least substantially T-shaped splitter adapter or an at least substantially Y-shaped splitter adapter.

8. The solenoid coil assembly of claim 1, wherein the solenoid coil is a nuclear-qualified solenoid coil.

9. A solenoid coil assembly, comprising:
a solenoid coil operable to actuate a valve connected to the solenoid coil; and
an electrical splitter adapter disposed between the solenoid coil and a light source, the electrical splitter adapter having electrical contacts that connect the solenoid coil in electrical parallel to the light source;
wherein the electrical splitter adapter is configured to be connected to an AC power source and to provide power from the AC power source to both the solenoid coil and the light source; and
further comprising a rectifier disposed between the electrical splitter adapter and the light source, the rectifier being operable to convert AC power from the AC power source to DC power.

10. The solenoid coil assembly of claim 9, further comprising the AC power source and wherein the electrical splitter adapter is connected to the AC power source.

11. The solenoid coil assembly of claim 9, further comprising a current sensor disposed between the electrical splitter adapter and the light source, the current sensor being operable to detect whether current is flowing from the AC power source.

12. The solenoid coil assembly of claim 9, wherein the electrical splitter adapter is an at least substantially T-shaped splitter adapter or an at least substantially Y-shaped splitter adapter.

13. The solenoid coil assembly of claim 9, wherein the solenoid coil is a nuclear-qualified solenoid coil.

14. A method of monitoring a solenoid coil, comprising:
connecting a light source adjacent to and in electrical parallel with the solenoid coil, the light source operable to provide an indication of an operational status of the solenoid coil when power is flowing to the solenoid coil; and
replacing the light source with a replacement light source without interrupting the power flowing to the solenoid coil.

15. The method according to claim 14, wherein the light source is operable to light up when the power is flowing to the solenoid coil.

16. The method according to claim 14, wherein the light source is operable to light up when power has stopped flowing to the solenoid coil.

17. The method according to claim 14, wherein the light source is an LED light source, further comprising converting the power flowing to the solenoid coil from AC power to DC power.

* * * * *